March 17, 1970     O. M. CONSOLE     3,501,402
PROCESS FOR THE PRODUCTION OF ORCHID WATER
Filed Oct. 23, 1968
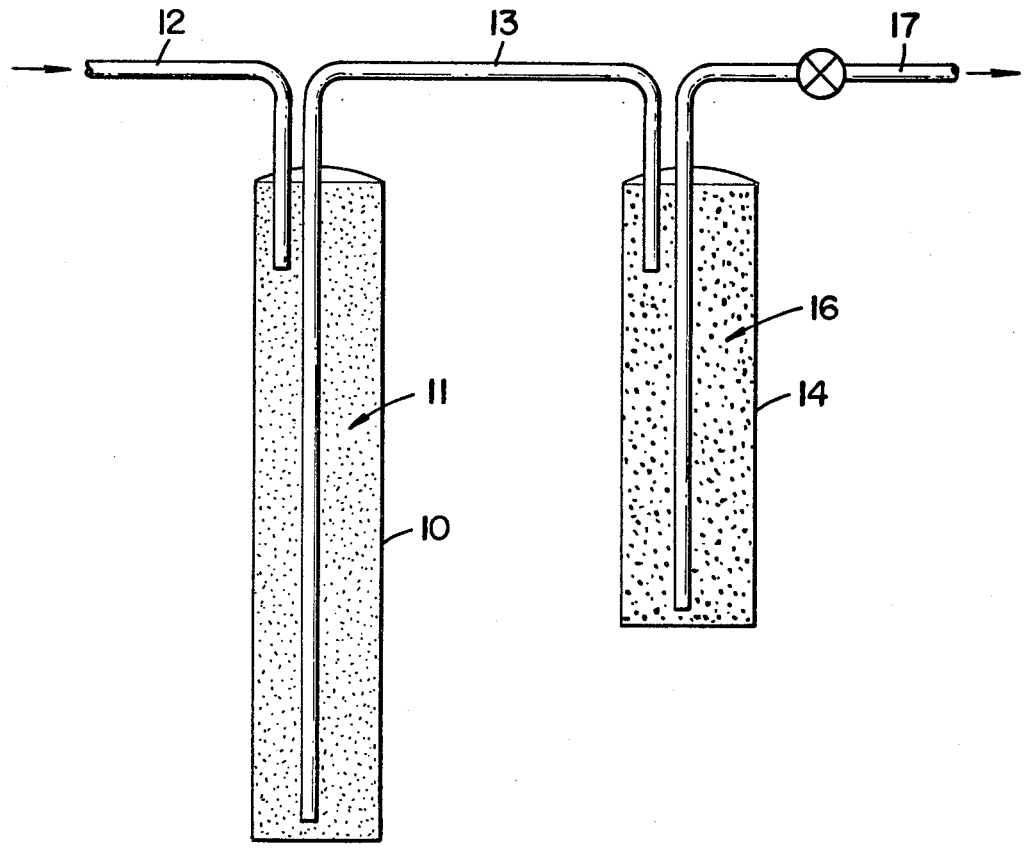
*INVENTOR.*
ORTHA M. CONSOLE
BY
ATTORNEYS United States Patent Office 3,501,402
Patented Mar. 17, 1970

3,501,402
PROCESS FOR THE PRODUCTION
OF ORCHID WATER
Ortha M. Console, Glendale, Calif., assignor to Foremost-McKesson, Inc., San Francisco, Calif., a corporation of Maryland
Filed Oct. 23, 1968, Ser. No. 769,978
Int. Cl. C02b 1/16, 1/46, 7/00
U.S. Cl. 210—38                    2 Claims

ABSTRACT OF THE DISCLOSURE

Process for the production of orchid water for orchid culture. City tap water is treated by contact with cation exchange resin operating on the hydrogen cycle, and thereafter its pH adjusted by contact with lime.

BACKGROUND OF THE INVENTION

It has been found that ordinary city tap water such as has been chemically treated or contains any significant amount of dissolved sodium, is injurious to the more common variety of orchids. Particularly it tends to inhibit plant growth and the development of good blossoms and root structure, and to cause leaf and root tip burn. This applies to both mature plants and plantlets developed from seeds or by meristem techniques. I have found that when tap water is treated by my process, it is no longer detrimental to orchids but in fact appears to be beneficial. Particularly it appears to stimulate plant growth and the development of good blossoms, to promote development of good root structure, and to prevent leaf and root tip burn.

SUMMARY OF THE INVENTION AND OBJECTS

This invention relates generally to making orchid water and a process for producing the same from city tap water.

In general it is an object of the invention to provide a simple process for the treatment of tap water to produce a water which can be used to advantage for the water requirements of orchids.

Another object of the invention is to provide a water for orchid culture which stimulates plant growth and promotes the general health of the plant. In this connection my special water has been found to reduce the time from seedling to blossoming time, thus substantially reducing the time and expense involved in developing seedlings to blooming plants. In addition, the use of the water appears to promote the growth of mature plants, and the development of a good healthy root structure. Also, it tends to inhibit the development of leaf and root tip burn.

In accordance with the present invention, ordinary tap water is contacted with cation exchange resin whereby the pH of the water is lowered to a value substantially below pH 6.0 and the sodium is removed. Thereafter the water is contacted with a calcium containing compound whereby the pH is raised to a value within the range of pH 6.0 to 7.0.

Additional objects and features of the invention will appear from the following description in which the preferred embodiment has been set forth in conjunction with the accompanying drawing.

BRIEF DESCRIPTION OF THE DRAWING

The single figure schematically illustrates apparatus especially adapted for carrying out the process.

DESCRIPTION OF THE PREFERRED EMBODIMENT

The drawing illustrates a closed tank or vessel 10 which contains a column 11 formed of cation exchange resin in the hydrogen form. Pipe 11 receives water from city supply pipes and delivers the water into one end of the column, the water being removed from the other end of the column through pipe 13. A second closed tank or vessel 14 is provided with a column 16 made of an acidity reducing calcium containing compound, such as pieces of calcium carbonate or crushed marble or limestone. A pipe 13 delivers the water to one end of the limestone column while pipe 17 receives water from the other end of the column for storage or direct application to orchids.

Typical city tap water as is supplied for the city of Los Angeles, analyzes as follows:

| Analysis of dissolved solids: | Parts per million |
|---|---|
| Silica ($SiO_2$) | 10.00 |
| Aluminum oxide ($Al_2O_3$) | .09 |
| Iron oxide ($Fe_2O_3$) | .02 |
| Calcium (Ca) | 54.00 |
| Magnesium (Mg) | 18.00 |
| Sodium (Na) | 148.00 |
| Sulphate ($SO_4$) | 296.00 |
| Chloride (Cl) | 97.00 |
| Carbonate ($CO_3$) | 0.00 |
| Bicarbonate ($HCO_3$) | 98.00 |
| Total solids | 721.11 |

The cation resin column 11 should be adequate to reduce the pH of the water to a value well below pH 6.0 and preferably to a value of the order of pH 2.2 to 3.0. This lowering of the pH of the water is related to the removal of sodium. Flow of the water through the limestone column 16 serves to add calcium whereby the pH is raised to a value of the order of 6.0 to 7.0. Aside from raising the pH, the addition of calcium is desirable in that orchids appear to thrive on a calcium content in excess of that normally found in tap water. Thus in typical instances the water after flow through the column 16 will have a calcium content of the order of from 205 to 220 p.p.m. (when treating the Los Angeles city water referred to above).

By way of example, in one particular instance the tank 10 measured 8 inches internal diameter, and was 40 inches long. The cation exchange resin was Nalco HCR. The tank 14 measured about 6 inches internal diameter, and was 18 inches long. The material comprising the column 16 was a good grade crushed white marble, ranging in size from about 16 to 40 mesh. Normal flow rates through the apparatus ranged from about 2 to 5 gallons per minute. Treatment of the Los Angeles city water referred to above produced a water analyzing as follows:

| Analysis of dissolved solids: | Parts per million |
|---|---|
| Silica ($SiO_2$) | 10 |
| Aluminum oxide ($Al_2O_3$) | 0 |
| Iron oxide ($Fe_2O_3$) | 0 |
| Calcium (Ca) | 210 |
| Magnesium (Mg) | 0 |
| Sodium (Na) | 0 |
| Sulphate ($SO_4$) | 296 |
| Chloride (Cl) | 97 |
| Carbonate ($CO_3$) | 0 |
| Bicarbonate ($HCO_3$) | 98 |
| Total solids | 711 |

Referring to the above analysis, it will be noted that the sodium and magnesium contents have been reduced to zero. The calcium content has been increased from 54 p.p.m. to 210 p.p.m. The pH has been reduced from 8.0, that of the original tap water, to 6.5.

Water produced as described above has been found to be of great value to the orchid industry. Assuming that it is used to supply all of the water requirements of orchids, it appears to stimulate the growth of seedings to the time of blossoming. For example, in typical instances the normal period from seedling to blossoming is about 4 to 5 years. It has been estimated that by using my special water this can be reduced to 2 to 3 years. In fact it has been found that when my special water is used, 2 months growth of some seedlings is equivalent to normal 2 years growth. Also the plants appear to develop better root structure, and the health of the plants is promoted, particularly in that plants supplied with the special water do not develop leaf or root tip burn. The simple apparatus for carrying out the process permits production of the special water with normal flow from the water supply pipes to the point of application of the water to the orchids. In other words, the apparatus can be inserted directly between the city water supply and the hose or other means used by the culturist in applying the treated water to the plants.

In the foregoing, I have referred generally to orchid culture. It is to be understood that I have reference to the more prevalent types in species of orchids such as are grown in the United States for commercial purposes or by hobbyists, including the species known as cymbidium, cattelya, phlaenopsis, stanhopea, faelia, catasetum, pendrobium, sobralia and the like.

I claim:

1. In a process for producing special water for supplying the water requirements of orchids, the steps of contacting tap water with cation exchange resin in the hydrogen form so that the sodium is removed and the pH of the water is lowered to a value of below pH 6.0 and then contacting the water with an acidity reducing calcium-containing compound so that the pH is raised to a value of the order of 6.0 to 7.0, and a calcium content is provided of the order of 205 to 220 p.p.m.

2. A process as in claim 1 in which the water is contacted with cation exchange resin to reduce the pH value of the water to 2.2 to 3.0 and remove the sodium.

References Cited

UNITED STATES PATENTS

| | | | |
|---|---|---|---|
| 2,117,631 | 5/1938 | Seyb | 210—59 X |
| 2,226,743 | 12/1940 | Riley | 210—38 |
| 2,317,961 | 4/1943 | Tschirner | 210—59 X |

OTHER REFERENCES

Northen, R. T.; Home Orchid Growing; 1962; pp. 35–36.

REUBEN FRIEDMAN, Primary Examiner

C. M. DITLOW, Assistant Examiner

U.S. Cl. X.R.

210—59